April 12, 1938.  C. E. COCHRAN  2,114,165
INDUSTRIAL TRUCK
Filed Aug. 17, 1936  2 Sheets-Sheet 2

INVENTOR.
CLYDE E. COCHRAN
BY Bates, Golrick, & Teare
ATTORNEYS

Patented Apr. 12, 1938

2,114,165

UNITED STATES PATENT OFFICE 2,114,165

INDUSTRIAL TRUCK

Clyde E. Cochran, Cleveland, Ohio, assignor to The Elwell-Parker Electric Company, Cleveland, Ohio, a corporation of Ohio Application August 17, 1936, Serial No. 96,420

3 Claims. (Cl. 214—65)

The present invention relates to a truck and particularly to an improved load-handling mechanism for an industrial truck which will be especially adaptable for use with those types of industrial trucks which are hydraulically operated.

Industrial trucks for handling loads and transporting them from place to place in manufacturing establishments are comparatively well known at the present time. Industrial trucks generally comprise a relative short frame, supporting a power unit at its forward end and having at its rearward end a load-engaging member, such as a platform adapted to engage a load resting comparatively close to the truck-supporting surface, and arranged to raise the load to enable it to be transported from place to place.

The general object of the present invention is to provide an improved load-handling mechanism, which is especially adapted for convenient operation by an hydraulic power mechanism.

A more specific object is to provide an improved form of mechanism for tilting a load-handling device or load carrier, relative to the frame of an industrial truck, which mechanism will be arranged for convenient operation by a hydraulic power unit carried by the truck frame.

Other and more specific objects and features of the present invention will become more apparent from the following description, reference being had to the accompanying drawings. The essential features of my invention will be set forth in the claims.

Figure 1:
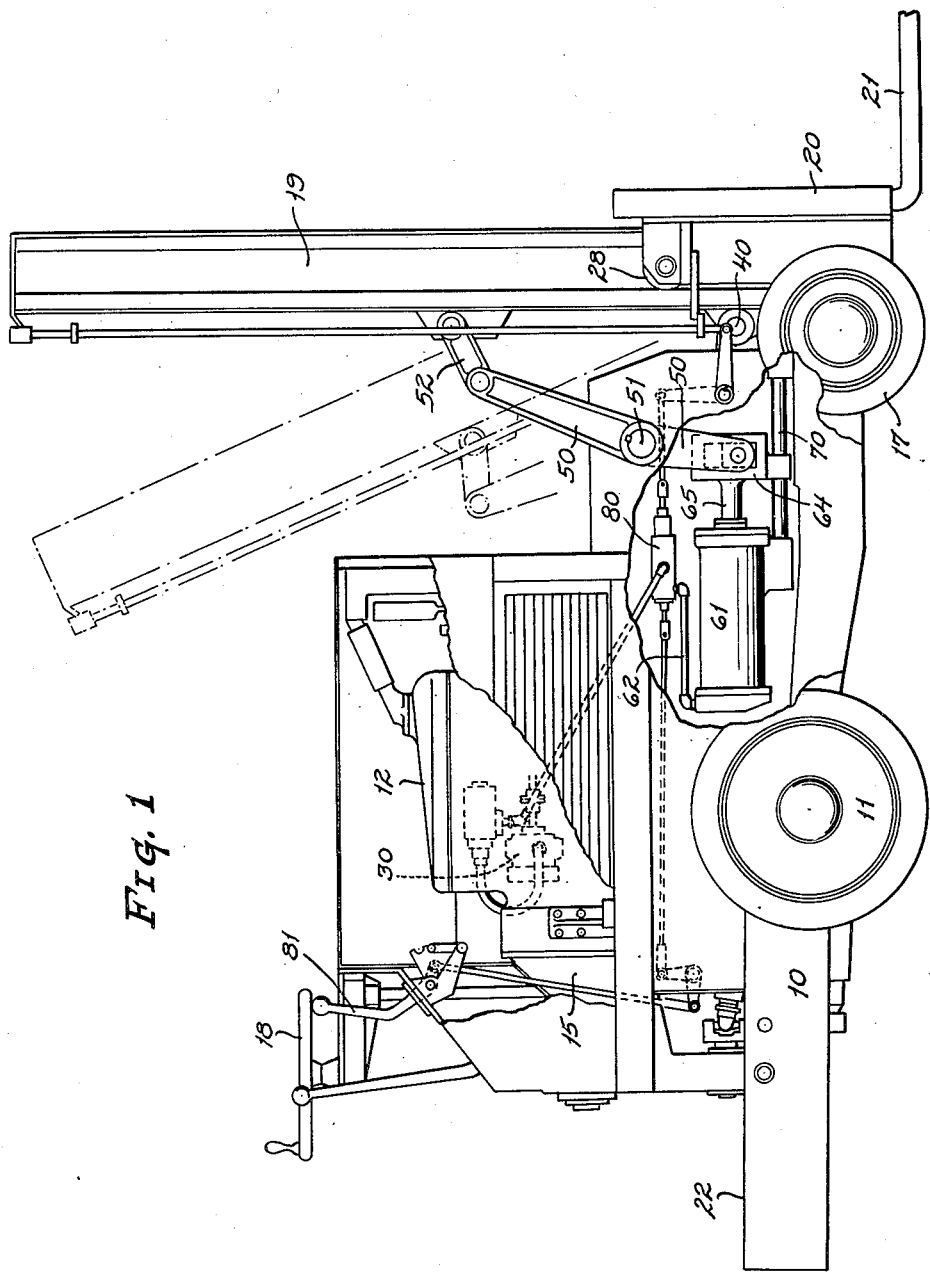
Figure 2:
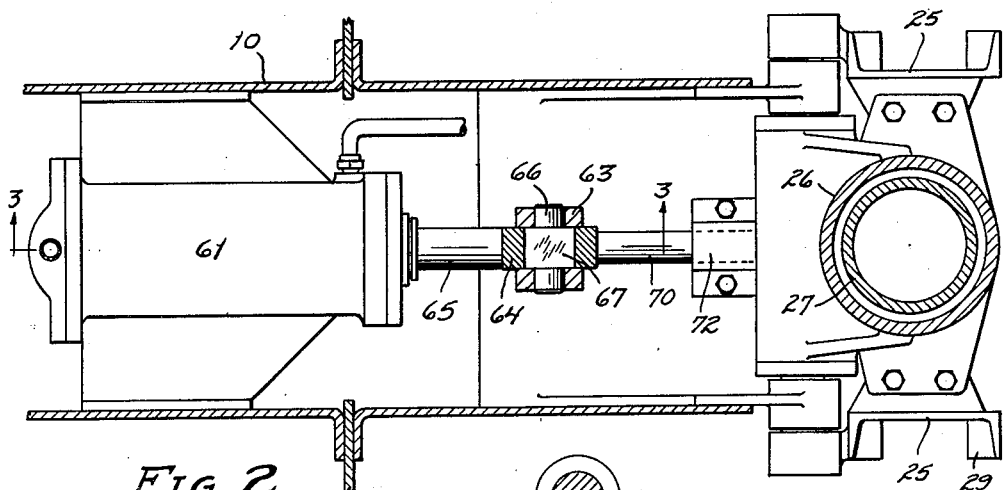
Figure 3:
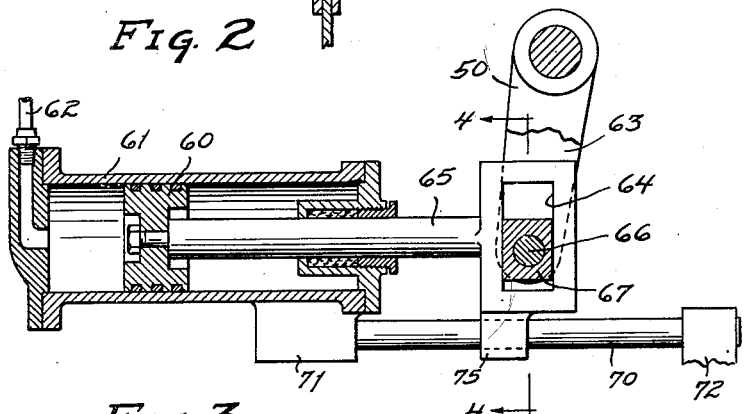
Figure 4:
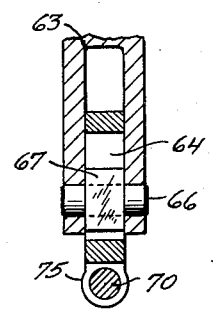
Figure 5:
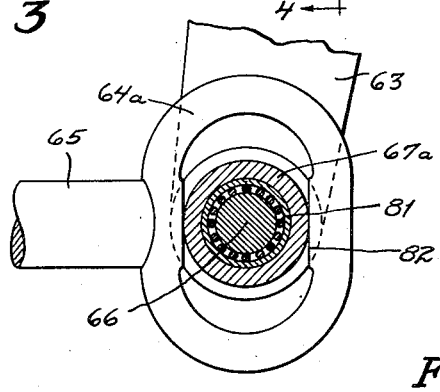
Figure 6:
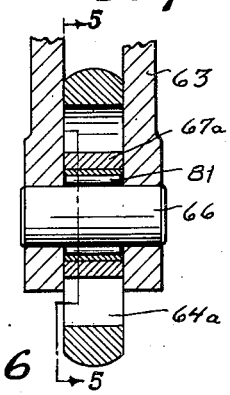

In the drawings, Fig. 1 is a side elevation of an industrial truck, embodying my invention, certain parts of the truck being broken away to more clearly illustrate the internal construction thereof; Fig. 2 is a fragmentary horizontal section, on an enlarged scale, the plane of the section being indicated by the lines 2—2 on Fig. 1; Fig. 3 is a vertical section indicated by the lines 3—3 on Fig. 2; Fig. 4 is a sectional detail, as indicated by the lines 4—4 on Fig. 3; Fig. 5 is a section illustrating a modified form of mechanism, the plane of the section being indicated by the lines 5—5 on Fig. 6; Fig. 6 is a sectional detail, taken along the lines 6—6 of Fig. 5.

In the drawings, I have illustrated my invention in connection with an industrial truck of the type illustrated in the application of Sheldon K. Towson, Serial No. 80,276, filed May 18th, 1936, and assigned to my assignee, The Elwell-Parker Electric Company. In general, this truck comprises a main frame 10, supported at its forward end by a pair of dirigibly arranged driving wheels 11, and at its rearmost end by a pair of load-supporting wheels 17. Supported on the forward end of the frame 10 is an internal combustion motor 12, which is connected with the dirigible driving wheels 11 by a clutch mechanism mounted within a housing 15 and a power transmission mechanism. A detailed description of a suitable power transmission mechanism may be had by reference to the copending application for Letters Patent of Sheldon K. Towson, Serial No. 76,372, filed April 25th, 1936, and assigned to my assignee. The wheels 11 and 17, all of which are preferably dirigibly arranged, are suitably connected to be controlled by a steering wheel 18.

At the rearward end of the truck is an upright guideway 19, on which a load supporting carriage 20 is mounted for vertical movement. This load supporting carriage may be provided with a platform member, or, as shown, with rearwardly extending load-engaging forks 21, which are positioned relatively close to the truck supporting surface and are arranged to be projected beneath a load, to enable the load to be lifted clear of the truck-supporting surface and transported from place to place. The forward end of the truck is provided with an operator's platform 22 and various control members, including the steering wheel above mentioned.

As illustrated in Fig. 1, the load-handling mechanism includes the upright guideway 19. As shown, this guideway is pivotally mounted adjacent its lower end to a transversely extending shaft 40, which is mounted on the main frame 10. This pivotal arrangement of the guideway 10 permits the load and guideway to be tilted forwardly to the position indicated by dotted lines in Fig. 1, thus enabling the weight of the load to be moved to a position substantially over the axis of the load-bearing wheel 17, thereby permitting the movement of comparatively heavy loads from place to place without the use of excessive counter-weights at the forward end of the truck to balance the load.

The motor 12 serves to raise and lower the carriage 20 in the guideway 19, through the medium of an hydraulic cylinder and piston arrangement suitably connected to an hydraulic pump 30. As illustrated in Fig. 2, the guideway 19 comprises a pair of outwardly facing channels 25, between which is mounted a hydraulic cylinder 26, within which a piston 27 is reciprocably mounted.

The carriage 20 is connected to the piston 27 in the usual manner. As indicated in Fig. 1, the carriage is provided with rollers 28, arranged to engage rails 29, carried by the flanges of the guideway channels 25. The arrangement of the carriage-lifting mechanism, together with its connection to the pump 30, is more fully illustrated, and described in application, Serial No. 80,276, heretofore mentioned.

The present invention is especially concerned with the mechanism for tilting the guideway 19, and, as heretofore mentioned, is especially adapted to be operated by an hydraulic power. One of the features of the present invention is the provision of an operating mechanism for tilting the guideway 19, which eliminates the use of flexible conduits for connecting the hydraulic pump 30 with the operating mechanism which tilts the guideway, thus eliminating the dangers otherwise resulting from failure of flexible conduits while the loads are being handled, and the consequent damage both to the truck and to the load being carried thereby.

The present invention also permits the use of standard rigid conduit and coupling members, that is, threaded pipes and pipe fittings ordinarily used when high fluid pressures are encountered.

The guideway 19 is, as shown in Fig. 1, tilted by a lever 50, which is pivotally connected intermediate its ends at 51, to a pivot shaft mounted on the main truck frame. At its upper end the lever 50 is pivotally connected, by a link 52, with the upright guideway 19. At its lower end, the link 50 is forked, as indicated in Fig. 2, and is pivotally connected to a piston 60 mounted in a hydraulic cylinder 61, rigidly secured to the frame 10, and which is connected, by suitable rigid piping 62, with the hydraulic pump 30. A valve mechanism 80 operable by a control lever 81 serves to control the flow of fluid pressure through the conduits. A suitable valve mechanism is more fully disclosed in the copending application for Letters Patent of Sheldon K. Towson, Serial No. 80,276, heretofore mentioned.

The connection between the tilting lever 50 and the hydraulic piston 60 is arranged to permit a rigid mounting of the cylinder on the truck frame and thereby permit the use of rigid conduits 62 connecting the pump with the cylinder. As shown in Figs. 2 and 3, the lower end of the lever 50 is forked, as indicated at 63, to embrace a vertically extending slideway 64, carried by the piston rod 65. Mounted in the fork 63 of the lever 50 is a shaft or rod 66, carrying a slide block 67 arranged to cooperate with the vertical walls of the guideway 64 in the usual manner, thus permitting the horizontal movement of the piston to rock the lever 50 about its pivot without disturbing the rigid connection between the cylinder 61 and the truck frame.

Undue strain on the piston rod 65 and the associated parts is prevented by a guide 70. This guide is in the form of a shaft or bar and is rigidly secured at one end to a boss 71, depending from the cylinder 61, and at its other end is secured in a suitable block 72, mounted on the frame 10. Slidingly embracing the guide 70 is an ear 75, preferably integrally formed with the guideway member 64. Thus it will be seen that the piston and guideway 64 are maintained in alignment with the cylinder at all times, thus preventing undue wear or binding of the parts.

In Figs. 5 and 6 I indicate a modified form of my invention, in which I provide the slide block taking the form of a roller 67a and has interposed between it and the pin 66 suitable anti-friction bearing members 81, thus reducing the friction between the slide block and the guideway to a minimum. With this form of roller the guideway 64a may be rounded at its end, as indicated in Fig. 5, and may be provided with oppositely facing pads 82 to engage the roller.

From the foregoing description it will be seen that I have provided an operating mechanism for tilting a load-handling device of a tier-lift truck, which may well be operated by hydraulically powered mechanism without the use of flexible conduits interconnecting the operating cylinder with the pump, wherein both the cylinder and the pump may readily be mounted on the frame and the truck chassis.

I claim:

1. An industrial truck having a frame, a motor mounted on one end of said frame, a normally vertically extending guideway mounted at the other end of said frame, supporting wheels for said frame, a driving connection between certain of said wheels and said motor, a load-engaging member mounted for vertical movement in said guideway, a pivotal connection between said guideway and said frame adapted and arranged to permit the guideway and load-engaging member to be tilted forwardly or rearwardly as desired, a lever pivotally connected to said frame intermediate said motor and said guideway, a link pivotally interconected between said lever and said guideway, a hydraulic cylinder rigidly secured to said frame with its axis extending longitudinally thereof and lying in a substantially horizontal plane, a piston carried by said cylinder and having a piston rod provided at its outer end with a vertically extending elongated opening, a guide for said piston rod, said lever being arranged to slidingly engage the walls of the opening in said piston rod, a hydraulic pump mounted on said frame, an operating connection between the motor and said pump and rigid connections arranged and adapted to conduct fluid pressure from said pump to said cylinder, and control means for said pressure.

2. In an industrial truck, a frame, supporting wheels therefor, a load supporting member pivotally secured to one end of the frame, a hydraulic pump mounted adjacent the other end of said frame, a hydraulic cylinder rigidly secured to said frame and extending longitudinally in a substantially horizontal plane, rigid conduits operatively connecting the cylinder with said pump, a piston in said cylinder, a piston rod connected to said piston and having an elongated vertically extended guideway slot in its outermost end, means to guide said piston for a straight line movement in a substantially horizontal plane, a lever pivoted intermediate its ends to said frame and anti-friction means carried by one end of said lever and arranged and adapted to cooperate with the walls of said vertical slot in the piston and provide a sliding pivoted connection between said lever and said piston rod, and a link pivotally interconnecting the other end of the lever with the load supporting member.

3. In an industrial truck, a frame, supporting wheels therefor, a normally vertically extending upright guide-frame mounted on a horizontal pivot adjacent one end of the truck frame, a load engaging member mounted for vertical movement on said upright, a hydraulic pump mounted on said frame, a hydraulic cylinder secured to said frame with its axis extending substantially longitudinally thereof, and in a substantially horizontal plane against movement relative to said frame, rigid conduits connecting said cylinder with said pump, means to control the flow of fluid from said pump to said cylinder, a piston in said cylinder, and having a piston rod provided at its outer end with a vertically extending elongated opening, means to guide said piston for movement in a substantially horizontal plane, a lever pivoted to said frame intermediate the cylinder and the upright, a link pivotally interconnecting the lever with the upright guide frame, and means arranged to slidably engage the wall of the opening in the piston rod and form a sliding pivoted connection between said lever and said piston.

CLYDE E. COCHRAN.